Figures 1, 1A:
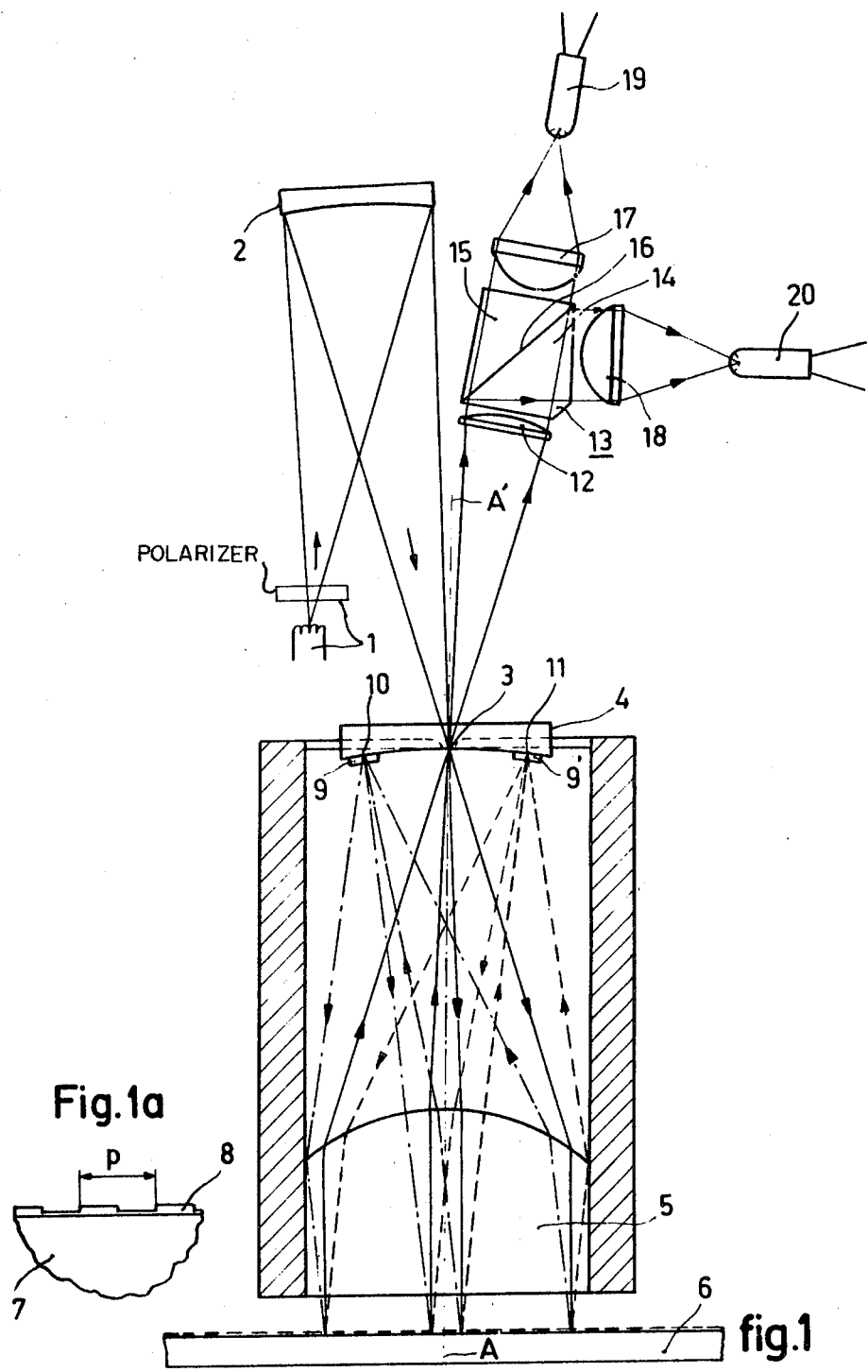

United States Patent
De Lang

[15] 3,648,055
[45] Mar. 7, 1972

[54] APPARATUS FOR DETERMINING THE RELATIVE MOVEMENT OF AN OBJECT WITH THE USE OF AN OPTICAL GRATING RIGIDLY SECURED TO THE OBJECT

[72] Inventor: Hendrik De Lang, Delft, Netherlands
[73] Assignee: U.S. Philips Corporation, New York, N.Y.
[22] Filed: Feb. 4, 1969
[21] Appl. No.: 796,508

[30] Foreign Application Priority Data

Feb. 6, 1968 Netherlands..........................6801683

[52] U.S. Cl.......................250/231 R, 250/237 R, 356/170
[51] Int. Cl. ...............................................G01d 5/34
[58] Field of Search..............250/231, 225, 219 Q, 216, 237; 356/171, 170

[56] References Cited

UNITED STATES PATENTS

| | | | |
|---|---|---|---|
| 3,297,879 | 1/1967 | Meyer | 250/219 Q X |
| 3,482,107 | 12/1969 | Hock | 250/225 X |
| 3,489,908 | 1/1970 | Hock et al. | 250/225 X |

*Primary Examiner*—James W. Lawrence
*Assistant Examiner*—D. C. Nelms
*Attorney*—Frank R. Trifari

[57] ABSTRACT

The invention relates to an apparatus for determining the relative movement of an object with the use of an optical grating rigidly secured to the object, in which energy emanating from a source of energy interacts with the grating and then is supplied to a system which is sensitive to this energy and converts it into an electric signal which is a periodic function of the movement of the objects characterized in that a second optical grating the periodic direction of which is at right angles to that of the first grating covers this first grating and is substantially coplanar with it.

3 Claims, 5 Drawing Figures

INVENTOR.
HENDRIK DE LANG 3,648,055

APPARATUS FOR DETERMINING THE RELATIVE MOVEMENT OF AN OBJECT WITH THE USE OF AN OPTICAL GRATING RIGIDLY SECURED TO THE OBJECT

SUMMARY OF THE INVENTION

Such an apparatus is known. It has the disadvantage that movements in one direction only can be measured. This disadvantage may be obviated by providing, for example, a cross-slide of a machine tool with two gratings, one on each of the two separate slides which together form the cross-slide. However, the accuracy so obtainable in determining the movements proves to be too small. Slight errors in the straight line guiding of the slide give rise to unadmissibly large errors in the positioning owing to tilting errors.

It is an object of the present invention to provide an apparatus of the above mentioned kind for measuring movements in two directions which is not subject to these errors but combines efficiency with precision. For this purpose, the invention is characterized in that a second optical grating the periodic direction of which is at right angles to that of the first grating covers this first grating and is substantially coplanar with it. The term "periodic direction" is in this case to be understood to mean the direction of the highest directional frequency in the structure.

Figure 2:
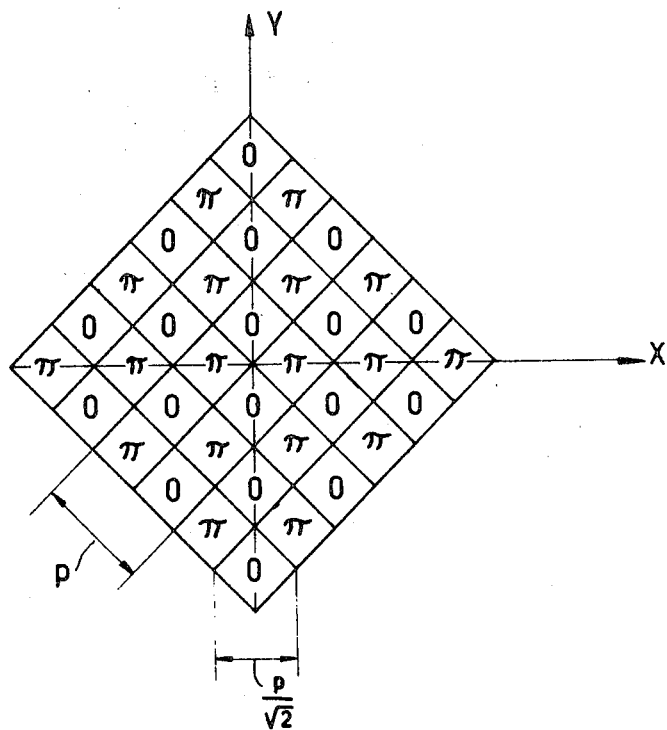
Figure 3:
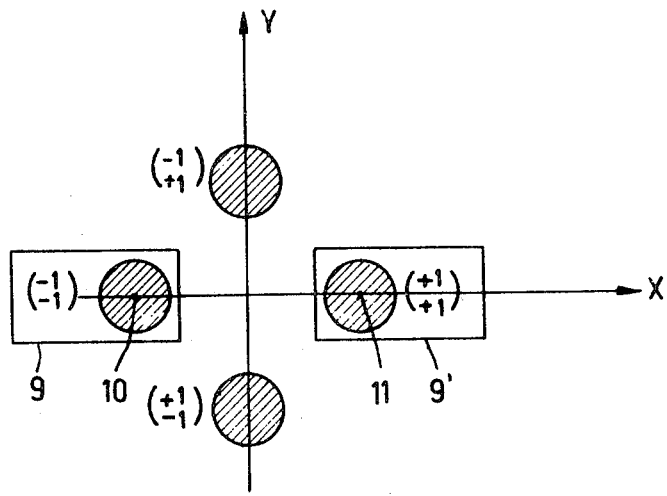
Figure 4:
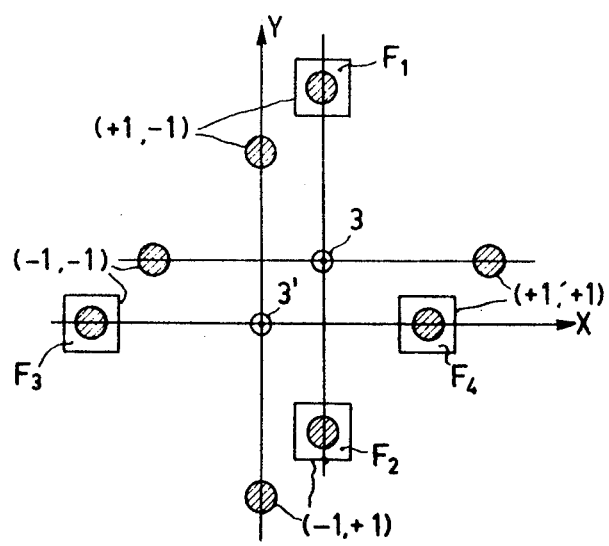

Features and advantages of the invention will appear from the following description of embodiments thereof, given by way of example only, with reference to the accompanying drawings, in which:

FIG. 1 shows a first embodiment of an apparatus in accordance with the invention, and FIG. 1a shows an enlargement of the scale grating, FIG. 2 and 3 show details of the apparatus of FIG. 1, and FIG. 4 shows a detail of a modification of the apparatus shown in FIG. 1.

In FIG. 1, a beam of linearly polarized light emanating from a source of light 1 is reflected at a concave mirror 2 and then passes through a small aperture 3 in or near a concave mirror 4. Through a simple or compound planoconvex lens 5 the light then falls on a reflection grating 6.

The distances of the concave mirror 2 from the source of light 1 and from the aperture 3 are such that an image of the light source 1 is formed approximately in the aperture 3. The aperture 3 is located substantially in the focus of the planoconvex lens 5 so that parallel light rays are incident on the reflection grating 6.

The grating 6, which is rigidly secured to the object, not shown, the movement of which is to be measured, is designed as a two-dimensional phase grating of the reflection type. It may be in the form of, for example, a glass substrate 7, on which is provided a periodic structure 8 of aluminum. The height of the layer 8 varies with a period $p$. The recessed squares of side $\frac{1}{2}p$ are surrounded by raised squares of side $\frac{1}{2}p$ and vice versa. Thus, the grating 6 has a checkered structure (FIG. 2). The difference in height between adjacent squares is such that the phase difference between the light beam reflected from adjacent squares is equal to $\pi$ or approximately $\pi$ radians. A difference in height between adjacent squares is therefore equal to an odd multiple of ¼ wavelength.

From the reflecting grating 6 coherent subbeams are reflected. Owing to the periodicity of the grating in two mutually perpendicular directions four beams of the "first" order are produced, namely $(+1, +1)$; $(+1, -1)$; $(-1, +1)$ and $(-1, -1)$. The first bracketed digit refers to the $x$ direction, the second to the $y$ direction. These four reflected beams pass through the lens 5, an image of each beam being formed at one of four locations of the mirror 4. The subbeams $(-1, -1)$ converge at an image location 10 and the subbeams $(+1, +1)$ at the image location 11. The two remaining image locations lie in a plane at right angles to the plane of the drawing which contains the axis A, A' of the system passing through the aperture 3.

The zero-order beams and the higher-order beams are eliminated: the zero-order beams emerge through the aperture 3 towards the light source 1 and the higher-order beams fall outside the reflecting surface of the mirror 4.

After reflection at the mirror 4, the four beams again pass through the lens 5 and are again reflected at the phase grating 6. From the subbeams twice reflected from the phase grating the beams are selected which after reflection form an image of the aperture 3 in this aperture. When the subbeams are designated by $(x_1, y_1; x_2, y_2)$, where $x$ and $y$ are the orders of diffraction in the $x$ and $y$ directions and the subscripts 1 and 2 refer to the first and second reflections at the grating 6, respectively, the four subbeams $(+1, +1; -1, -1)$; $(+1, -1; -1, +1)$; $(-1, +1; +1, -1)$ and $(-1, -1; +1, +1)$ pass through the aperture 3.

Via a lens 12 the four subbeams are incident on a beam splitting prism 13 comprising two components parts 14 and 15 which are cemented to one another along an interface 16 normal to the plane of the drawing. The interface 16 comprises thin layers of alternately high and low refractive indices. A suitable choice of the angle of incidence on the interface 16 insures the light to be incident at approximately the Brewster angle. The thickness of the thin layers is also suitably chosen. This insures that light the direction of vibration of which is at right angles to the plane of the drawing is largely reflected and light the direction of vibration of which is parallel to the plane of the drawing is largely transmitted.

The path of the light between the planoconvex lens 5 and the mirror 4 includes two $\lambda/4$ plates 9 and 9', the plate 9 being arranged on the mirror 4 at the image location 10 of the subbeam $(-1, -1)$ and the plate 9' on the image location 11 of the subbeam $(+1, +1)$. The principal direction of the $\lambda/4$ plates makes an angle of 45° with the direction of vibration of the linearly polarized light emitted by the light source 1. The beams $(-1, -1)$ and $(+1, +1)$ pass twice through the plate 9 and 9' respectively, once before and once after reflection at the mirror 4, while the beams $(+1, -1)$ and $(-1, +1)$ do not pass through the plates. The linearly polarized light which has twice passed through the plates 9 or 9' respectively after these passages has a direction of polarization which is at right angles to that before the passages and hence at the right angles to that of the beams $(+1, -1)$ and $(-1, +1)$. The first-mentioned two beams are separated from the last-mentioned beams in the beam-splitting prism 13. The first pair of beams contains information about one direction of movement ($y$), the other pair information about the other direction of movement ($x$). One beam pair falls through a lens 17 on a photosensitive detector 19, the other pair through a lens 18 on a photosensitive detector 20.

The signals produced on movement of a grating of period $q$ through a distance $s$ may be represented by $$S_1 = \text{constant} + \sin \frac{2\pi s}{q/4}$$

In the above case, $q = p\sqrt{2}\cdot 2$ and the grating is moved in two directions $x$ and $y$ at right angles to one another so that two signals are produced:

$$S_x = \text{const.} + \sin \frac{2\pi x}{(1/8)p\sqrt{2}}$$

and $$S_y = \text{const.} + \sin \frac{2\pi y}{(1/8)p\sqrt{2}}$$

The output signals of the photosensitive detectors may be processed in known manner.

When the mirror 4 is caused to vibrate at a frequency $\Omega$, signals of the form $$S_x = \text{const.} + C \sin\left(\frac{2\pi x}{(1/8)p\sqrt{2}} + b \sin \Omega\, t\right)$$

and $$S_y = \text{const.} + C \sin\left(\frac{2\pi y}{(1/8)p\sqrt{2}} + b \sin \Omega\, t\right)$$

are produced. In these formulas, $$b = \frac{2\pi u}{p\sqrt{2/8}}$$

, where $u$ is the amplitude of the vibration.

The advantage of a vibrating mirror 4 is that even with a stationary grating 6 the signals applied to the photocells 19 and 20 contain an alternating voltage component.

By means of an apparatus according to the invention masks for integrated circuits may be made. The photosensitive plate is secured to the grating 6. The grating 6 is given a movement in the $x$ direction and the grooves of the grating which extend parallel to the $y$ direction are counted by means of the signal periods in the $x$ direction. Straight line guiding is effected by using the phase-modulated signal produced by the vibrating mirror 4 by means of the grating grooves extending in the $x$ direction. The error signal of the $y$ signal is fed back to the $y$ drive. Thus the grating 6 is guided along the grooves which extend parallel to the $x$ direction.

The single source of light which emits polarized light may be replaced by two closely adjacent light sources which emit unpolarized light. Now, if (FIG. 4) on the mirror 4 in which the aperture 3 is replaced by two closely adjacent apertures 3 and 3', the locations $F_1$ and $F_2$ at which the maxima (+1, −1) and (−1, +1) respectively of the beam from one of the light sources and the location $F_3$ and $F_4$ at which the maxima (−1, −1) and (+1, +1) respectively of the beam from the other adjacent light source are produced are covered with a light-absorbing material, signals are produced in two pairs of adjacent photocells respectively which also may be processed in known manner.

What is claimed is:

1. An apparatus for determining the relative movement of an object in two orthogonal directions, comprising a source of light having a known wavelength, a two-dimensional reflecting diffracting grating attached to the object for diffracting light from the source by reflection into a plurality of ordered beams aligned in two orthogonal directions, means for redirecting the first order beams back to the surface of the grating means whereby the first order beams are diffracted by reflection, means for separating the twice reflected beams corresponding to the two orthogonal directions of the ordered beams, and means for sensing each of the separated beams.

2. An apparatus as claimed in claim 1, wherein the source of light comprises a source of plane-polarized light, and wherein the means for separating the twice reflected beams comprises means for rotating the plane of polarization of the first order beams corresponding to a first of the two orthogonal directions of ordered beam alignment by an angle of 90°, and a polarization sensitive beam splitting prism located in the path of the twice-reflected beams between the grating means and the sensing means.

3. Apparatus as claimed in claim 1, wherein the reflecting diffraction grating means comprises a first plurality of coplanar reflecting surfaces, a second plurality of coplanar reflecting surfaces lying in a plane parallel to the plane of the first plurality of reflecting surfaces and spaced therefrom a distance equal to an odd multiple of ¼ wavelength of the light from the source, the first plurality of reflecting surfaces and second plurality of reflecting surfaces forming a checkerboard pattern.

* * * * *